(12) United States Patent
Kim et al.

(10) Patent No.: US 11,741,643 B2
(45) Date of Patent: Aug. 29, 2023

(54) RECONSTRUCTION OF DYNAMIC SCENES BASED ON DIFFERENCES BETWEEN COLLECTED VIEW AND SYNTHESIZED VIEW

(71) Applicants: LAWRENCE LIVERMORE NATIONAL SECURITY, LLC, Livermore, CA (US); ARIZONA BOARD OF REGENTS ON BEHALF OF ARIZONA STATE UNIVERSITY, Scottsdale, AZ (US)

(72) Inventors: Hyojin Kim, Davis, CA (US); Rushil Anirudh, Dublin, CA (US); Kyle Champley, Pleasanton, CA (US); Kadri Aditya Mohan, Newark, CA (US); Albert William Reed, Los Lunas, NM (US); Suren Jayasuriya, Tempe, AZ (US)

(73) Assignees: Lawrence Livermore National Security, LLC, Livermore, CA (US); Arizona Board of Regents on Behalf of Arizona State University, Scottsdale, AZ (US)

( * ) Notice: Subject to any disclaimer, the term of this patent is extended or adjusted under 35 U.S.C. 154(b) by 202 days.

(21) Appl. No.: 17/208,849

(22) Filed: Mar. 22, 2021

(65) Prior Publication Data

US 2022/0301241 A1 Sep. 22, 2022

(51) Int. Cl.
*G06T 11/00* (2006.01)
*G06T 7/207* (2017.01)
*G06T 15/08* (2011.01)

(52) U.S. Cl.
CPC ............ *G06T 11/008* (2013.01); *G06T 7/207* (2017.01); *G06T 15/08* (2013.01);
(Continued)

(58) Field of Classification Search
CPC ....... G06T 11/008; G06T 7/207; G06T 15/08; G06T 2207/20084; G06T 2207/30181; G06T 2210/41
See application file for complete search history.

(56) References Cited

U.S. PATENT DOCUMENTS

| | | | |
|---|---|---|---|
| 6,289,135 B1 * | 9/2001 | Declerck | G06T 7/215 |
| | | | 324/309 |
| 2008/0205722 A1 * | 8/2008 | Schaefer | G06T 7/11 |
| | | | 382/128 |

(Continued)

OTHER PUBLICATIONS

Pan,Tinsu et al. "4d-ct imaging of a volume influenced by respiratory motionon multi-slice ct" Medical physics, 31(2):333-340, (Year: 2004).*

(Continued)

*Primary Examiner* — Michael Le
(74) *Attorney, Agent, or Firm* — Perkins Coie LLP

(57) ABSTRACT

A system for generating a 4D representation of a scene in motion given a sinogram collected from the scene while in motion. The system generates, based on scene parameters, an initial 3D representation of the scene indicating linear attenuation coefficients (LACs) of voxels of the scene. The system generates, based on motion parameters, a 4D motion field indicating motion of the scene. The system generates, based on the initial 3D representation and the 4D motion field, a 4D representation of the scene that is a sequence of 3D representations having LACs. The system generates a synthesized sinogram of the scene from the generated 4D representation. The system adjusts the scene parameters and the motion parameters based on differences between the collected sinogram and the synthesized sinogram. The processing is repeated until the differences satisfy a termination criterion.

20 Claims, 3 Drawing Sheets

(52) U.S. Cl.
CPC ............... *G06T 2207/20084* (2013.01); *G06T 2207/30181* (2013.01); *G06T 2210/41* (2013.01)

(56) References Cited

U.S. PATENT DOCUMENTS

| | | | | |
|---|---|---|---|---|
| 2010/0295846 | A1* | 11/2010 | Schaefer ................ | A61B 6/022 345/419 |
| 2018/0064403 | A1* | 3/2018 | Konta .................... | A61B 5/055 |
| 2019/0057523 | A1* | 2/2019 | Cao ....................... | G06T 11/005 |
| 2020/0077969 | A1* | 3/2020 | Lee ....................... | A61B 6/5258 |

OTHER PUBLICATIONS

Keal, Paul J. et al. "Acquiring 4d thoracic ct scans using a multislice helical method" Physics in Medicine & Biology, 49(10):2053, (Year: 2004).*
Pan,Tinsu et al. (4d-ct imaging of a volume influenced by respiratory motionon multi-slice ct) Medical Physics, 31(2):333-340, 2004 (Year: 2004).*
Keal, Paul J. et al. (Acquiring 4d thoracic ctscans using a multislice helical method.) Physics in Medicine & Biology, 49(10):2053, 2004 (Year: 2004).*
ASM Handbook, vol. 2: Properties and Selection: Nonferrous Alloys and Special-Purpose Materials, ASM Handbook Committee, p. 102, DOI: 10.1361/asmhba0001060.
Andersen, Anders H. "Algebraic reconstruction in ct from limited views," IEEE transactions on medical imaging, 8(1):50-55, 1989.
Andersen, Anders H. et al. "Simultaneous algebraic reconstruction technique (sart): a superior implementation of the art algorithm." Ultrasonic imaging, 6(1):81-94, 1984.
Anirudh, R. et al. "Lose the Views: Limited Angle CT Reconstruction via Implicit Sinogram Completion," CVPR, 2018.
Anirudh, Rushil et al. Lose the views: Limited angle ct reconstruction via implicit sinogram completion. In Proceedings of the IEEE Conference on Computer Vision and Pattern Recognition, pp. 6343-6352 (2018).
Castillo, Richard et al. "A framework for evaluation of deformable image registration spatial accuracy using large landmark point sets." Physics in Medicine & Biology, 54(7):1849, 2009.
Chambolle, Antonin et al. "A first-order primaldual algorithm for convex problems with applications to imaging." Journal of mathematical imaging and vision, 40(1):120-145, 2011.
Champley, K. "Livermore Tomography Tools (LTT) Software Package," 2016.
Chang, Ji-Ho et al. Regularized image reconstruction algorithms for positron emission tomography. IEEE transactions on medical imaging, 23(9):1165-1175, 2004.
De Chiffre, Leonardo et al. Industrial applications of computed tomography. CIRP annals, 63(2):655-677, 2014.
Dempster, Arthur P. et al. "Maximum likelihood from incomplete data via the em algorithm." Journal of the Royal Statistical Society: Series B (Methodological), 39(1):1-22, 1977.
Dowd, Betsy A. et al. Developments in synchrotron x-ray Tomography II, vol. 3772, pp. 224-236. International Society for Optics and Photonics, 1999.
Frikel, Jurgen et al. "Characterization and reduction of artifacts in limited angle tomography." Inverse Problems, 29(12):125007, 2013.
Gibbs, JW et al. "The three-dimensional morphology of growing dendrites." Scientific reports, 5(1):1-9, 2015.
Goerres, Gerhard W. et al. "Pet-ct image co-registration in the thorax: influence of respiration." European journal of nuclear medicine and molecular imaging, 29(3):351-360, 2002.
Han, Yoseob et al. "Framing u-net via deep convolutional framelets: Application to sparse-view ct." arXiv preprint arXiv: 1708.08333, 2017.
Huang, Yixing et al. Restoration of missing data in limited angle tomography based on helgason-ludwig consistency conditions. Biomedical Physics & Engineering Express, 2017.

Hudson, H. Malcolm et al. "Accelerated image reconstruction using ordered subsets of projection data." IEEE transactions on medical imaging, 13(4):601-609, 1994.
Jaderberg, M. et al. "Spatial Transformer Networks," Advances in Neural Information Processing Systems, pp. 2017-2025 (2015).
Jin, Kyong Hwan et al. "Deep convolutional neural network for inverse problems in imaging." IEEE Transactions on Image Processing, 26(9):4509-4522, 2017.
Kachelrieb, Marc et al. "Ecg-correlated image reconstruction from subsecond multi-slice spiral ct scans of the heart." Medical physics, 27(8):1881-1902, 2000.
Kak, A.C. et al. "Principles of Computerized Tomographic Imaging." IEEE press, 1998. <www.slaney.org/pct/pct-toc.html>.
Kang, Eunhee et al. "A deep convolutional neural network using directional wavelets for low-dose x-ray ct reconstruction." arXiv preprint arXiv:1610.09736, 2016.
Keal, Paul J. et al. "Acquiring 4d thoracic ct scans using a multislice helical method." Physics in Medicine & Biology, 49(10):2053, 2004.
Kim, H. et al. "Extreme Few-view CT Reconstruction using Deep Inference," Deep Inverse NeurIPS Workshop, 2019.
Kingma, Diederik P. et al. "Adam: A method for stochastic optimization." arXiv preprint arXiv:1412.6980, 2014.
Konovalov, Alexander B. "Spatial resolution analysis for few-views discrete tomography based on mart-ap algorithm." ISRN Signal Processing, 356291, 2013.
Liu, Shichen et al. "Soft rasterizer: A differentiable renderer for image-based 3d reasoning." In Proceedings of the IEE International Conference on Computer Vision, pp. 7708-7717, 2019.
Loper, Matthew M. et al. "Opendr: An approximate differentiable renderer." In European Conference on Computer Vision, pp. 154-169. Springer, 2014.
Lu, Yang et al. "Few-view image reconstruction with dual dictionaries." Phys Med Biol, 57(1):173-189, 2012.
Mildenhall, B. et al. "Nerf: Representing scenes as neural radiance fields for view synthesis," arXiv preprint arXiv:2003.08934, (2020).
Mohan, K. Aditya et al. "Timbir: A method for time-space reconstruction from interlaced views." IEEE Transactions on Computational Imaging, 1(2):96-111, 2015.
Niu, Shanzhou et al. "Sparse-view x-ray ct reconstruction via total generalized variation regularization." Physics in Medicine & Biology, 59(12):2997, 2014.
Pan, Tinsu et al. "4d-ct imaging of a volume influenced by respiratory motion on multi-slice ct." Medical physics, 31(2):333-340, 2004.
Paszke, A. et al. "Pytorch: An Imperative Style, High-Performance Deep Learning Library," Advances in Neural Information Processing Systems, pp. 8026-8037 (2019).
Ritschl, Ludwig et al. "Improved total variation-based ct image reconstruction applied to clinical data." Physics in Medicine & Biology, 56(6):1545, 2011.
Sadeghirad, A. et al. Convected particle domain interpolation technique to extend applicability of the material point method for problems involving massive deformations, 2011, International Journal for Numerical Methods in Engineering 86: 1435-1456.
Sadeghirad, A. et al. "Second-order convected particle domain interpolation (cpdi2) with enrichment for weak discontinuities at material interfaces." International Journal for Numerical Methods in Engineering, 95(11):928-952, 2013.
Shepp, Lawrence A. et al. "The fourier reconstruction of a head section." IEEE Transactions on nuclear science, 21(3):21-43, 1974.
Shu, Z. et al. "Deforming Autoencoders: Unsupervised Disentangling of Shape and Appearance," ECCV, pp. 650-665, 2018.
Sidky, Emil Y. et al. "Accurate image reconstruction from few-views and limited-angle data in divergent-beam ct." Journal of X-ray Science and Technology, 14(2):119-139, 2006.
Sitzmann, Vincent et al. "Implicit neural representations with periodic activation functions." Advances in Neural Information Processing Systems, 33, 2020.
Tancik, Matthew et al. "Fourier features let networks learn high frequency functions in low dimensional domains." arXiv preprint arXiv:2006.10739,2020.

(56) References Cited

OTHER PUBLICATIONS

Ulyanov, Dmitry et al. "Deep image prior." In Proceedings of the IEEE Conference on Computer vision and Pattern Recognition, pp. 9446-9454, 2018.
Venkatakrishnan, Singanallur V. et al. A model based iterative reconstruction algorithm for high angle annular dark field-scanning transmission electron microscope (haadf-stem) tomography. IEEE Transactions on Image Processing, 22(1):4532-4544, 2013.
Masov, Vitaly V. et al. Few-Views Image Reconstruction with SMART and an Allowance for Contrast Structure Shadows, pp. 667-677. Springer International Publishing, Cham, 2015.
Xu, Qiong et al. "Low-dose x-ray ct reconstruction via dictionary learning." IEEE Transaction on Medical Imaging, 31(9), 2012.
Yariv, Lior et al. "Universal differentiable renderer for implicit neural representations." arXiv preprint arXiv:2003.09852, 2020.
Zang, Guangming et al. "Space-time tomography for continuously deforming objects." 2018.
Zang, Guangming et al. "Warp-and-project tomography for rapidly deforming objects." ACM Transactions on Graphics (TOG), 38(4):1-13, 2019.
Zhang, Hanming et al. "Image prediction for limited-angle tomography via deep learning with convolutional neural network." arXiv preprint arXiv:1607.08707, 2016.

\* cited by examiner

RECONSTRUCTION OF DYNAMIC SCENES BASED ON DIFFERENCES BETWEEN COLLECTED VIEW AND SYNTHESIZED VIEW

STATEMENT REGARDING FEDERALLY SPONSORED RESEARCH

This invention was made with Government support under Contract No. DE-AC52-07NA27344 awarded by the United States Department of Energy. The Government has certain rights in the invention.

BACKGROUND

In many environments, there is a need to represent motion of a dynamic scene (or object) from views collected from the dynamic scene. For example, for clinical diagnosis, a medical provider may want to review motion of the heart of a patient during its cardiac cycles. A scanning technology, such as computed tomography ("CT"), may be used to collect views an object and generate a three-dimensional ("3D") image of the object from the views. The views are typically collected at various angles around the object. If the object is not in motion, an accurate 3D image may be generated. However, if the object is dynamic (e.g., moving or deforming), a 3D image cannot effectively represent the dynamics. Dynamic computed tomography (DCT) have been used to represent the dynamics of an object. However, image reconstructed using DCT may have visible artifacts and blurry edges, for example, depending on the amount of movement or deformation. Moreover, existing DCT techniques typically require views collected over multiple rotations (e.g., 720 or 1080 degrees) relative to the object. In contrast, static CT typically employs a half rotation or a full rotation, and limited-view CT employs less than a half rotation.

CT is a technique that noninvasively generates cross-sectional images (or views) of the linear attenuation coefficients ("LACs") of materials in an object of interest (target volume). CT has been used extensively in medical and security applications such as for generating a scan of a brain or a scan of baggage at an airport. The LAC is a measure of the attenuation of X-rays as the X-rays pass through a certain material and is in units of inverse length (e.g., per centimeter). To generate the LACs, CT employs an X-ray source and an X-ray detector. The X-ray source transmits X-rays through the object with an initial intensity, and the X-ray detector, which is on the opposite side of the object from the source, measures the final intensities of the X-rays that pass through the object and impinge on pixels of a detector. CT collects measurements by positioning the source and detector at various angles relative to the object and collects the measurements of the final intensity at each angle. The measurements for an angle are referred to as a projection or a view. The measurements of the intensities may be represented as a negative of a logarithm of a ratio of transmission data of a scan of the object to transmission data of a scan without the object (e.g., scan of air). Various techniques may be used to collect measurements at different angles relative to the object. For example, the source and detector may be stationary and the object may be rotated, the object may be stationary and the source and detector may be rotated, and multiple stationary transmitters and detectors may be positioned at different angles. CT algorithms then reconstruct from the collection of measurements a 3D image of the object that specifies the LAC for each volume element ("voxel") with the volume of the object. The cross-sectional images are generated from the 3D image.

Conventional CT generally require that the number of projections be roughly equal to the number of pixels in a projection depending on scanner resolution and the view row size. In practice, the number of projections that can be collected may be severely limited for various reasons. For example, some CT protocols require that the X-ray dose delivered to the object (e.g., baggage or patient) be limited. One way to reduce the dose is to limit the number of projections that are collected. As another example, CT systems that are flux-limited may employ long integration times per projection to collect adequate measurements. CT systems may be flux-limited because of dim sources (low current), large source-to-detector distances, small detector pixels, and/or highly attenuating objects. To increase throughput, a flux-limited CT system may have time to generate only a small number of projections. As another example, when the object is moving or deforming (e.g., a beating human heart), a CT system may deliberately collect a limited number of projections to shorten the data acquisition time to reduce the artifacts associated with the object dynamics. As another example, some CT systems employ multiple source-detector pairs mounted on a stationary gantry (e.g., for scanning carry-on baggage at an airport). The projections of such a CT system are limited by the number of sources.

DETAILED DESCRIPTION

Figure 1:
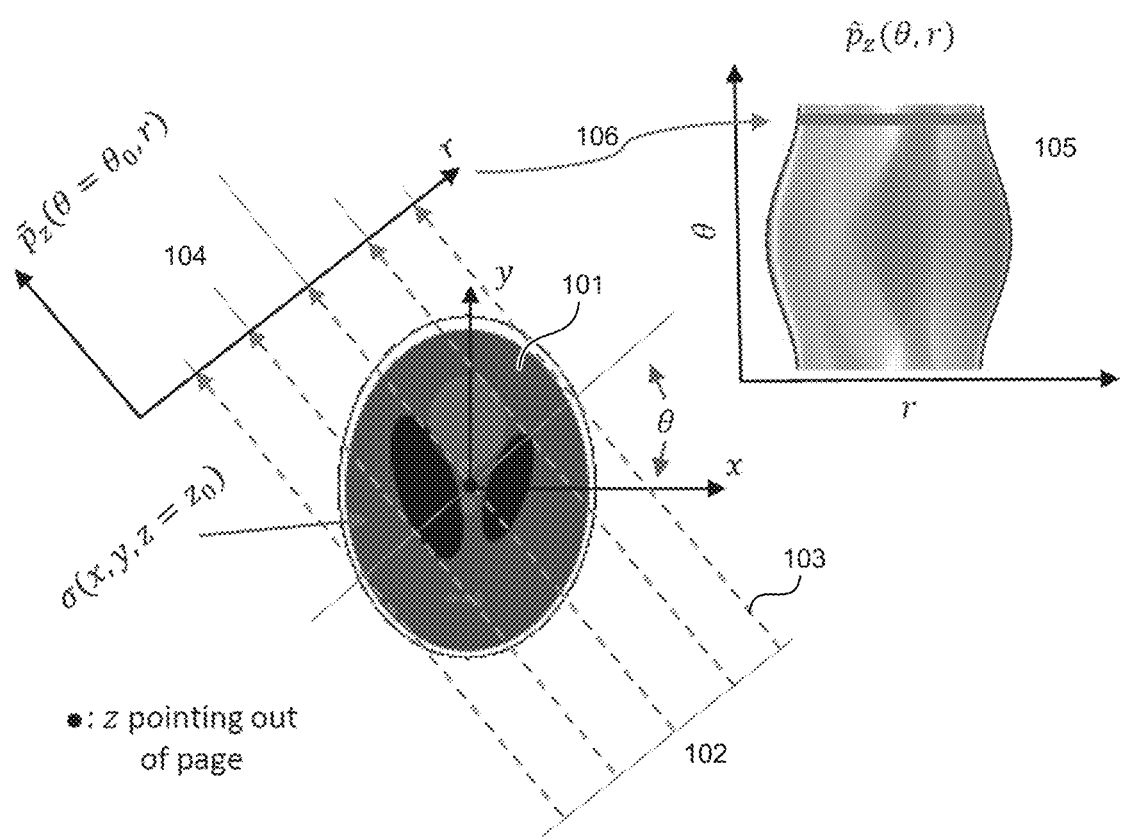
FIG. 1 is a diagram that illustrates a collected frame for a slice collected based on a parallel-beam X-ray source.

A method and system are provided for generating a 4D scene representation of a 3D scene (referred to as a scene or object) to illustrate the dynamics of the scene. A 4D scene representation of the dynamics of a scene may include a sequence of 3D scene representations (3D representations) that vary over time. In some embodiments, a 4D scene reconstruction (4DSR) system generates a 4D scene representation (4D representation) of a scene given a collected view of the scene collected at various angles relative to the scene, for example, using CT technology. The collected view may be based on projections collected from angles within a range (e.g., 180 or 360 degrees) over a collection period. Each frame of the collected view may represent the intensities of a single slice of the scene. For example, if an X-ray detector collects intensities for 50 rows, then the collected view includes 50 frames with each frame representing intensities for each angle and for each column of the row. A collected view may be, for example, a sinogram generated based on projections collected by an X-ray detector. The 4DSR system iteratively generates, based on the collected view, a 4D representation that is a sequence of possible 3D representations of that scene that iteratively converge on a 4D representation that represents the dynamics of the scene. As used in the following, the term "motion" generally refers movement or deformation (that is the dynamics) of a dynamic object.

In some embodiments, during each iteration, the 4DSR system generates a sequence of 3D representations based on an initial 3D representation generated for that iteration and a sequence of 3D motion fields that represent motion of the scene. The sequence of 3D representations is a 4D representation of the scene. The 4DSR system generates a synthesized view from the 4D representation and compares the synthesized view to the collected view. Like a collected view, the synthesized view may be a sinogram. Based on the comparison, the 4DSR system optimizes weights (i.e., adjusts weights) used in generating the initial 3D representation and the 3D motion fields. The 3D motion fields compose a 4D motion field representing motion of the scene. The 4DSR system then repeats this optimization process until a termination criterion is satisfied such as the synthesized view is sufficiently close to the collected view. When the termination condition is satisfied, the 4D representation that was last generated represents motion of the scene given the collected view. The 4DSR system thus dynamically learns the weights (also referred to as parameters) for generating the initial 3D representations and the sequences of 3D motion fields until the synthesized view matches the collected view. Notably, the 4DSR system does not need a training phase to learn the weights based on training data prior to processing any collected views.

In some embodiments, the 4DSR system employs a 3D representation generator to generate the initial 3D representation for each iteration. Each 3D representation includes an LAC for each voxel of the scene. The 3D representation generator includes scene weights that control the generating of the initial 3D representation, for example, given a static input (e.g., randomly generated). During each iteration, the 4DSR system adjusts the scene weights of the scene based on differences between the collected view and the synthesized view for that iteration. The 4DSR system may employ various optimization techniques when adjusting scene weights such as a loss function. (e.g., L1 loss) to assess the differences and gradient descent to when determining scene weights. The 3D representation generator may employ various machine learning techniques such as a multi-level perceptron (MLP) which may be a convolutional neural network (CNN). The input to the MLP may be randomly generated and static in the sense that the input does not change from iteration to iteration. Thus, the 4DSR system tends to learn scene weights so that the 3D representation generator outputs an initial 3D representation with LACs that are similar to those of the scene prior to start of the motion.

In some embodiments, the 4DSR system employs a 4D motion generator to generate a sequence of 3D motion fields that represent the motion of the scene. A 3D motion field includes a motion value for each voxel of the scene. The motion value for a voxel indicates movement of the portion of the scene represented by that voxel to a different voxel in the next 3D representation. The motion value may be represented by x, y, and z deltas indicating direction of motion. For example, if a portion of the scene is currently in voxel (4, 2, 12) and the motion value is (0, 1, −2), that portion is indicated as moving to voxel (4, 3, 10). The deltas may be relative to a default motion field that indicates a default motion rather than no motion. The 4D motion generator may employ a polynomial with a motion weight (e.g., coefficient) for each coordinate (x, y, and z) of each voxel. Given the coordinates of a voxel and time of the motion, the 4D motion generator applies the polynomial to generate the motion value for that voxel. The time of the motion may be expressed as a value between 0.0 and 1.0. For example, if the scene is a cardiac cycle that is 0.9 seconds, a time of motion of 0.5 represents 0.45 seconds into the cardiac cycle. The scene may also cover multiple cardiac cycles. Similar to the learning of the scene weights, the 4DSR system may learn the motion weights using gradient descent to minimize a loss function. The number of 3D representations in the 4D representation may correspond to the number of angles from which the collected view was collected.

In some embodiments, the 4DSR system may employ a 4D representation generator that inputs an initial 3D representation and a 4D motion field and generates a 4D representation. During each iteration, the 4D representation generator generates a sequence of 3D representations (i.e., the 4D representation) based on the 4D motion field. Continuing with the example, the voxel (4, 3, 10) of a 3D representation that is generated based on a 3D motion field may be assigned the LAC that was assigned to voxel (4, 2, 12) in the initial 3D representation. In some embodiments, the 4D representation generator may assign the LAC that was assigned to a voxel in an earlier 3D representation generated during that iteration by the 4D representation generator.

In some embodiments, after generating the sequence of 3D representations (i.e., the 4D representation) for an iteration, the 4DSR system may employ a synthesized view generator that forward projects each the 3D representation to generate a synthesized frame assuming a different angle of projection for each 3D representation. The synthesized view generator may generate the synthesized view using a Radon transform assuming a parallel-beam CT scanner. The 4DSR system may be employed with other scanner geometries by using different forward projection models, which may be formulated as a matrix multiplication adapted to the scanner geometry.

In some embodiments, the 4DSR system employs an optimizer to adjust the scene weights and the motion weights (i.e., parameters) to minimize a loss function. The 4DSR system completes when a termination criterion is satisfied. For example, the termination criterion may be when the loss is below a threshold loss, when the number of iterations is greater than a threshold number, or when the value of the loss function converges.

The 4DSR system may be used in a variety of applications to generate a representation of motion. For example, one application may be to view motion of an organ such as a heart or lungs. Another application may be to view a geological process such as motion of lava in a lava dome. Another application may be to view operation of an internal component of a manufactured product. Although the 4DSR system is described primarily in the context of CT, the 4DSR system may be used with any technology that provides views of an object that represent characteristics (e.g., LACs) of material within the object.

FIG. 1 is a diagram that illustrates a collected frame for a slice collected based on a parallel-beam X-ray source. The X-ray source 102 transmits X-rays represented by dashed lines 103 through scene 101 that are detected by X-ray detector 104. At each angle $\theta$ and for each slice z a projection $\tilde{p}_z(\theta,r)$ is collected where r represents a horizontal location of the projection. Frame 105 represents the intensities for a slice collected at each angle $\theta$. Arrow 106 points to the intensities for one slice. At each angle, the intensities for all the slices are typically collected simultaneously. The collected view is collection of the per-slice, collected frames.

As described above, the optimizer may employ a Radon transform that maps LACs of a 3D representation to intensities at an angle. The Radon transform may be represented by the following equation:

$$p_\theta(r,z) = -\sigma(x,y,z,t) \cdot \delta(x\cos(\theta) + y\sin(\theta) - r) dx dy,$$

where t represents time of collection at an angle and $\delta(\ )$ represents a Dirac delta function. The 4DSR system may assume that the LAC of each voxel remains constant during a collection but assumes the LACs of each voxel may vary from collection to collection resulting from the motion of the scene.

In some embodiments, the 4DSR system may employ an implicit neural representation architecture (e.g., MLP) to implement the 3D representation generator. An implicit neural network is implicitly defined on image coordinates for inverse optimization problems. (See, Ulyanov, D., Vedaldi, A. and Lempitsky, V., "Deep Image Prior," Proc. IEEE Conf. on Computer Vision and Pattern Recognition, pp. 9446-9454, 2018, which is hereby incorporated by reference.) The 3D representation generator may be represented by $\tilde{\sigma}_\theta$ that maps coordinates (x, y, z) to LACs $\tilde{\sigma}(x, y, z)$. The 3D representation generator may employ a Gaussian random Fourier feature (GRFF) layer that provides the input to an MLP. (See, Tancik, M., Srinivasan, P. P., Mildenhall, B., Fridovich-Keil, S., Raghavan, N., Singhal, U., Ramamoorthi, R., Barron, J. T., and Ng, R., "Fourier Features Let Networks Learn High Frequency Functions in Low Dimensional Domains," arXiv:2006.10739, 2020, which is hereby incorporated by reference.) The computation of a GRFF may be represented by the following equation:

$$\gamma(v) = [\cos(2\pi\kappa B v), \sin(2\pi\kappa B v)]$$

where v=(x, y, z), B is a vector randomly sampled from a Gaussian distribution N(0,1), cos and sin are performed element-wise, and K is a bandwidth factor to control sharpness of output of the 4DSR system. The bandwidth factor allows the frequency bandwidth of the initial 3D representation to be regularized to help ensure convergence on a solution.

In some embodiments, the input to the 3D representation generator may be an input 3D representation with the LACs set to random values. For example, if the 3D representation is $80^3$, the value for voxel (0,0,0) may be (−1,−1,−1) and the value for voxel (79,79,79) may be (1,1,1). The GRFF layer converts this input 3D representation into a frequency domain.

In some embodiments, the 4D motion field generator generates the 3D motion fields that are used to "warp" the initial 3D representation to different times to reflect motion of the scene as represented by the following equation:

$$(\tilde{\sigma} \rightarrow \sigma(x,y,z,t_0), \sigma(x,y,z,t_1), \ldots, \sigma(x,y,z,t_N))$$

where N represents a time interval. The number of time intervals may be adjusted factoring in speed of convergence, desired accuracy, and so on. The motion fields may be represented by a polynomial equation of order k as represented by the following:

$$W(x,y,z,t) = (c_{x_0} + c_{x_1} t + \ldots + c_{x_k} t^k, c_{y_0} + \ldots + c_{y_k} t^k, c_{z_0} + c_{z_1} t + \ldots + c_{z_k} t^k),$$

where the coefficients $(c_{x_i}, c_{y_i}, c_{z_i})_{i=0,\ldots,k}$ represent motion weights and $t \in [0,1]$. The 4D representation generator may generate the sequence of the 3D representations based on the following equation:

$$\sigma(x,y,z,t) = \text{warp\_fn}(W(x,y,z,t); \tilde{\sigma}(x,y,z))$$

where warp_fn is a warping function that may employ differential image sampling such as that implemented by grid_sample( ) of PyTorch. (See, Jaderberg, M., et al., "Spatial Transformer Networks," Advances in Neural Information Processing Systems, pp. 2017-2025, 2015 and Paszke, A., et al., "Pytorch: An Imperative Style, High-Performance Deep Learning Library," Advances in Neural Information Processing Systems, pp. 8026-8037, 2019, both of which are hereby incorporated by reference.) The 4DSR system may optimize the values of the coefficients until convergence using gradient descent.

In some embodiments, the 4DSR system may employ a hierarchical coarse-to-fine approach for generating the motion fields where coarse motion is estimated first, and then iteratively refined to higher resolution. The initial motion field may be at the base resolution, and then progressively increased in resolution (e.g. $2^3$, $4^3$, $8^3$, ... ). The progressive increase in resolution may improve image quality and speed of convergence of the optimization process.

After generating the synthesized view for an iteration, the 4DSR system compares that synthesized view to the collected view. To enforce a loss, the 4DSR system employs the 3D Radon transform in a differentiable programming fashion where the intensity of each synthesized pixel is differentiable with respect to a view angle. In this way, the derivatives can be backpropagated through this operation and towards the scene weights and motion weights for analysis-by-synthesis. The synthesized view generator may employ PyTorch's grid_sample( ) function which uses trilinear interpolations to rotate a 3D representation according the view angle and then sums along the columns to generate the 3D Radon transform and leverage the automatic differentiation functionality of PyTorch to calculate derivatives. The optimizer updates the scene weights and the motion weights via gradient descent to minimize a loss function, which may, for example, be represented by the following equation:

$$\min_{\phi, c_i} \lambda_1 \| R_{\theta(t)}(\sigma(x, y, z, t) - R_{\theta(t)}(GT)) \|\frac{1}{1} + \lambda_2 TV(c_{i=0,\ldots,k}), t \in [0, 1].$$

where GT (ground truth) represents the collected view, TV is a total variation term to regularize the motion fields, $\lambda_1$ and $\lambda_2$ are weights for the loss and regularizer. The fist term is an L1 loss function based on the collected view and the synthesized view. The weights $\lambda_2$ may be tuned to the expected amount of motion in the scene. For example, the weight may be small for rapid motion and large for slow motion.

The 4DSR system may be employed in a wide variety of applications. For example, one application may be to identify the activation site of a cardiac arrhythmia. A cardiologist can view the 4D representation of a patient's heart to help identify a target location for an ablation procedure. The 4DSR system may also be employed in additive manufacturing to help identify problems in the manufacturing process. For example, if analysis of the 4D representation indicates an unplanned bulge in a product, the manufacturing may be adjusted manually or automatically. The 4D representation may be compared to a ground truth 4D representation to determine whether a problem has occurred and the needed correction. The 4DSR system may also be used in material science application to study deformation of a product under pressure. For example, since different designs of a component of a product may result in different types of deformations, the 4DSR system can be used study of the effects of the designs when the product is subject to various physical conditions that affect movement or deformation of the component.

The computing systems on which the 4DSR system may be implemented may include a central processing unit, input devices, output devices (e.g., display devices and speakers), storage devices (e.g., memory and disk drives), network interfaces, graphics processing units, cellular radio link interfaces, global positioning system devices, and so on. The input devices may include keyboards, pointing devices, touch screens, gesture recognition devices (e.g., for air gestures), head and eye tracking devices, microphones for voice recognition, and so on. The computing systems may include desktop computers, laptops, tablets, e-readers, personal digital assistants, smartphones, gaming devices, servers, and so on. The computing systems may access computer-readable media that include computer-readable storage media (or mediums) and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have recorded on it or may be encoded with computer-executable instructions or logic that implements the 4DSR system. The data transmission media is used for transmitting data via transitory, propagating signals or carrier waves (e.g., electromagnetism) via a wired or wireless connection. The computing systems may include a secure cryptoprocessor as part of a central processing unit for generating and securely storing keys and for encrypting and decrypting data using the keys. The computing systems may be servers that are housed in a data center such as a cloud-based data center.

The 4DSR system may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various embodiments. Aspects of the 4DSR system may be implemented in hardware using, for example, an application-specific integrated circuit (ASIC) or field programmable gate array ("FPGA").

As described above, the 3D representation generator of the 4DSR system may be implemented by a CNN. A CNN has multiple layers such as a convolutional layer, a rectified linear unit ("ReLU") layer, a pooling layer, a fully connected ("FC") layer, and so on. Some more complex CNNs may have multiple convolutional layers, ReLU layers, pooling layers, and FC layers. The 3D representation generator inputs a static image that does not change from iteration to iteration and outputs an initial 3D representation.

A convolutional layer may include multiple filters (also referred to as kernels or activation functions). A filter inputs a convolutional window, for example, of an image, applies weights to each pixel of the convolutional window, and outputs an activation value for that convolutional window. For example, if the static image is 256 by 256 pixels, the convolutional window may be 8 by 8 pixels. The filter may apply a different weight to each of the 64 pixels in a convolutional window to generate the activation value also referred to as a feature value. The convolutional layer may include, for each filter, a node (also referred to a neuron) for each pixel of the image assuming a stride of one with appropriate padding. Each node outputs a feature value based on a set of weights for the filter that are learned by the optimizer of the 4DSR system by adjusting the scene weights after each iteration The ReLU layer may have a node for each node of the convolutional layer that generates a feature value. The generated feature values form a ReLU feature map. The ReLU layer applies a filter to each feature value of a convolutional feature map to generate feature values for a ReLU feature map. For example, a filter such as max(0, activation value) may be used to ensure that the feature values of the ReLU feature map are not negative.

The pooling layer may be used to reduce the size of the ReLU feature map by downsampling the ReLU feature map to form a pooling feature map. The pooling layer includes a pooling function that inputs a group of feature values of the ReLU feature map and outputs a feature value.

The FC layer includes some number of nodes that are each connected to every feature value of the pooling feature maps. Each node has a filter with its own set of weights that are adapted to the LAC of a voxel of a 3D representation.

Figure 2:
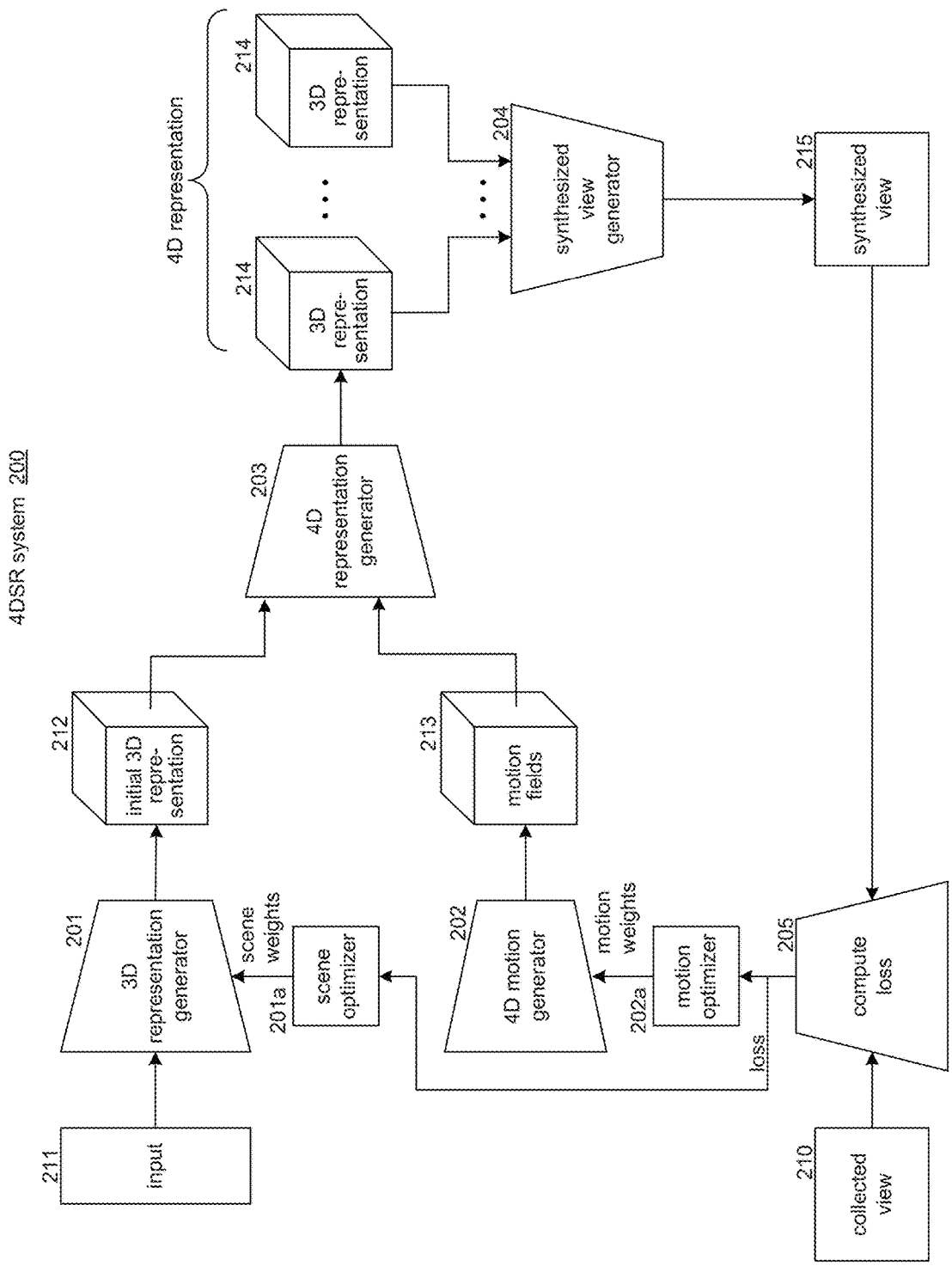
FIG. 2 is a block diagram that illustrates an architecture of the 4DSR system in some embodiments.

FIG. 2 is a block diagram that illustrates an architecture of the 4DSR system in some embodiments. The 4DSR system includes a 3D representation generator 201, a 4D motion generator 202, a 4D representation generator 203, a synthesized view generator 204, a loss function 205, a scene optimizer 201a, and a motion optimizer 202a. During each iteration, the 3D representation generator inputs a base 3D representation and outputs an initial 3D representation 212 based on the scene weights that are learned. The 4D motion generator outputs 3D motion fields 213 generated based upon the motion weights. The 4D representation generator inputs the initial 3D representation and the 3D motion fields and outputs a 4D representation of the scene that is a sequence of 3D representations 214 representing the motion of the initial 3D representation based on the 4D motion fields. The synthesized view generator inputs the 34 representation and generates a synthesized view 215 of the scene. The loss function inputs the synthesized view and a collected view 210 and calculates the loss between the synthesized view and the collected view. The scene optimizer inputs the loss and applies a gradient descent technique to adjust the scene weights. The motion optimizer inputs the loss and applies a gradient descent technique to adjust the motion weights. The 4DSR system that performs the next iteration. Although not shown, when a termination criterion is satisfied, the 4D representation that was generated during the last iteration represent the motion of the scene as represented by the collected view.

Figure 3:
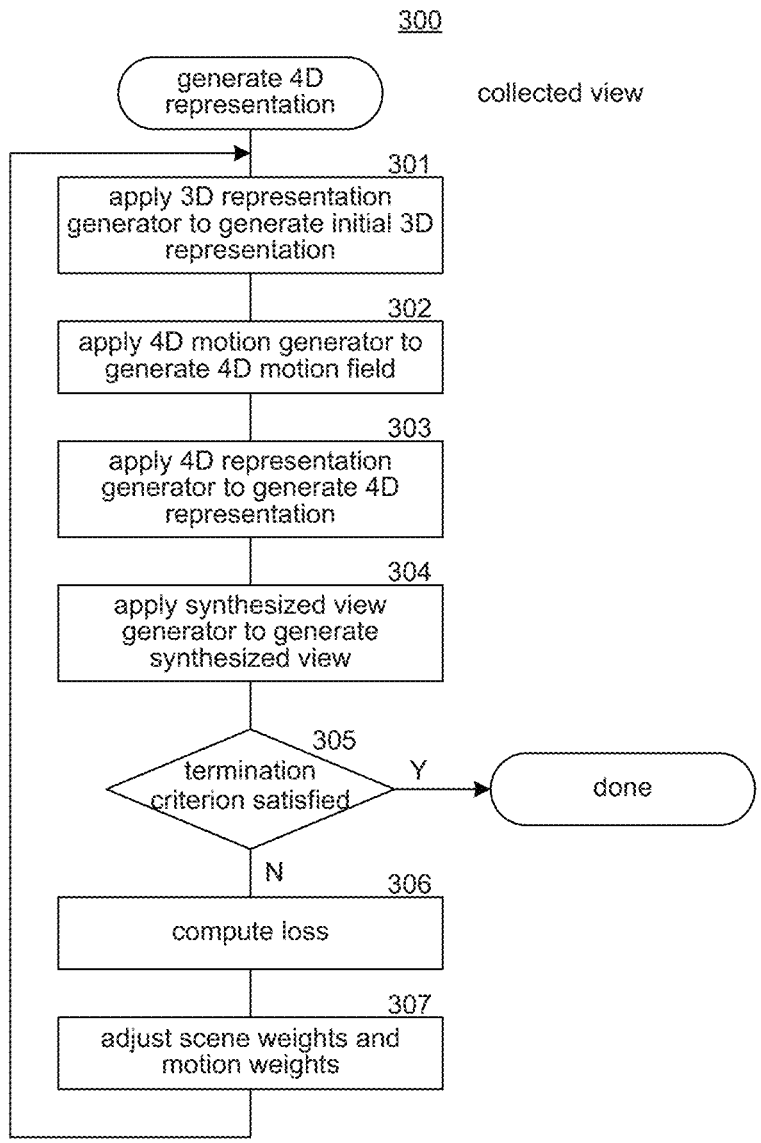
FIG. 3 is a flow diagram that illustrates the processing of a generate 4D representation component that generates a 4D representation of the scene given a collected view of the scene.

FIG. 3 is a flow diagram that illustrates the processing of a generate 4D representation component that generates a 4D representation of the scene given a collected view of the scene. The generate 4D representation component performs iterations to generate 4D representations of the scene based on the collected view until a termination criterion is satisfied. In block 301, the component applies a 3D representation generator to generate an initial 3D representation of the scene based on scene weights that are learned during the iterations. In block 302, the component applies a 4D motion generator to generate a 4D motion field that is a sequence of 3D motion fields based on motion weights that are learned during the iterations. In block 304, the component applies the 4D representation generator to generate a 4D representation of the scene based on the initial 3D representation and the 4D motion field. In block 304, the component applies a synthesized view generator to generate a synthesized view of the scene given the 4D representation generated by the 4D representation generator. In decision block 305, if a termination criterion is satisfied, then the component completes, else the component continues at block 306. In block 306, the component applies a loss function to compute the loss between the synthesized view and the collected view. In block 307, the component applies a scene optimizer and a motion optimizer to learn the scene weights and fields weights based on the loss. The component then loops to block 301 to perform the next iteration.

The following paragraphs describe various embodiments of aspects of the CNNIR system. An implementation of the 4DSR system may employ any combination of the embodiments. The processing described below may be performed by a computing device with a processor that executes computer-executable instructions stored on a computer-readable storage medium that implements the 4DSR system.

In some embodiments, a method performed by one or more computing systems is provided for generating a four-dimensional (4D) representation of a three-dimensional (3D) scene that has motion, the 4D representation representing the motion of the scene. The method accesses a collected view of the scene. The collected view represents attenuation of an electromagnetic signal transmitted through the scene at various angles. For each of a plurality of iterations, the method performs the following. The method applies a 3D representation generator to generate an initial 3D representation of the scene for the iteration. The 3D representation generator has scene weights. A 3D representation has voxels that each represents a portion of the scene. The method applies a 4D motion generator to generate a 4D motion field as a sequence of 3D motion fields for the iteration. A 3D motion field indicates location of voxels of the initial 3D representation. The 4D motion generator has motion weights. The method applies a 4D representation generator to generate a 4D representation having a sequence of 3D representations based on the initial 3D representation and the 4D motion field. The method generates a synthesized view of the scene from the generated 4D representation. The method completes an iteration by adjusting the scene weights and the motion weights based on differences between the collected view and the synthesized view. In some embodiments, the electromagnetic signals are transmitted by an electromagnetic transmitter and collected by an electromagnetic collector. In some embodiments, the 3D representation generator is a neural network. In some embodiments, the 3D representation generator comprises a random sampling layer and a neural network. The random sampling layer has an input and generates an output based on a random sample of a distribution and a sharpness factor. The generated output is input to the neural network which outputs an initial 3D representation. In some embodiments, the 4D motion generator generates the 4D motion field based on a polynomial equation with a motion weight for each coordinate of each voxel for each order of the polynomial equation. In some embodiments, the 4D representation generator generates attenuation coefficients using differentiable image sampling. In some embodiments, the adjusting of the scene weights and the motion weights applies a gradient descent to minimize an objective function.

In some embodiments, a method performed by one or more computing systems is provided for generating a four-dimensional (4D) representation a scene based on a collected view of the scene. The collected view is collected while the scene is in motion. The method generates a 4D representation of the scene based on an initial three-dimensional (3D) representation and a 4D motion field. The initial 3D representation is generated based on scene parameters. The 4D motion field is generated based on motion parameters. The method generates a synthesized view of the scene from the generated 4D representation. The method adjusts the scene parameters and the motion parameters based on differences between the collected view and the synthesized view. In some embodiments, the method generates the 3D representation. A 3D representation has voxels that each represents a portion of the scene. The method generates the 4D motion field that includes the motion field that indicates motion of voxels of the initial 3D representation. In some embodiments, the method repeats the generating of the initial 3D representation, the 4D motion field, the 4D representation, and the synthesized view and the adjusting of the scene parameters and motion parameters until a termination criterion is satisfied. In some embodiments, the scene includes a body part. In some embodiments, the scene includes an object that is being manufactured. In some embodiments, the scene relates to a geological event.

In some embodiments, one or more computing systems are provided for generating a four-dimensional (4D) representation of an object in motion based on a collected view of the object that is collected when the object is in motion. The one or more computing systems include one or more computer-readable storage mediums for storing computer-executable instructions for controlling the one or more computing systems and one or more processors for executing the computer-executable instructions stored in the one or more computer-readable storage mediums. Until a termination condition is satisfied, the instructions generate an initial three-dimensional (3D) representation of the object based on object parameters. A 3D representation has voxels representing portions of the object. The instructions generate a 4D motion field based on motion parameters. The 4D motion field indicates location over time of voxels of the initial 3D representation. The instructions generate a 4D representation of the object based on the initial 3D representation and the 4D motion fields. The 4D representation is a sequence of 3D representations that each represents a different time. The 4D representation comprises the 3D representations. The instructions generate a synthesized view of the object based on the 4D representation. The instructions then adjust the object parameters and the motion parameters based on differences between the collected view and the synthesized view. In some embodiments, a linear attenuation coefficient is associated with each voxel. In some embodiments, the instructions that generate the 4D representation generate linear attenuation coefficients for voxels.

In some embodiments, one or more computer-readable storage media stores instructions. The instructions include instructions of a three-dimensional (3D) representation generator that generates an initial 3D representation of a scene based on scene parameters. A 3D representation has voxels with values. The instructions include instructions of a four-dimensional (4D) motion generator that generates a 4D motion field based on motion parameters. The 4D motion field indicates motion of voxels of the scene. The instructions include instructions of a 4D representation generator that generates a 4D representation of the scene based on the initial 3D representation and the 4D motion field, the 4D representation including a sequence of 3D representations that voxels with voxel values. The instructions include a synthesized view generator that generates a synthesized view of the scene based on the 4D representation. The instructions include a loss function that calculates a difference between a collected view of the scene and the synthesized view. The instructions include an optimizer that adjusts the scene parameters and the motion parameters based on the difference. In some embodiments, the instructions further comprise instructions that determine whether a termination criterion is satisfied based on the difference. In some embodiments, the collected view and synthesized view are sinograms. In some embodiments, the 3D representation generator includes a multi-level perceptron.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

The invention claimed is:

1. A method performed by one or more computing systems for generating a four-dimensional (4D) representation of a three-dimensional (3D) scene that has motion, the 4D representation representing the motion of the scene, the method comprising:
    accessing a collected view of the scene, the collected view representing attenuation of an electromagnetic signal transmitted through the scene at various angles; and
    for each of a plurality of iterations,
        applying a 3D representation generator to generate an initial 3D representation of the scene for the iteration, the 3D representation generator having scene weights, a 3D representation having voxels that each represent a portion of the scene;
        applying a 4D motion generator to generate a 4D motion field as a sequence of 3D motion fields for the iteration, a 3D motion field indicating location of voxels of the initial 3D representation, the 4D motion generator having motion weights;
        applying a 4D representation generator to generate a 4D representation having a sequence of 3D representations based on the initial 3D representation and the 4D motion field;
        generating a synthesized view of the scene from the generated 4D representation; and
        adjusting the scene weights and the motion weights based on differences between the collected view and the synthesized view.

2. The method of claim 1 wherein the electromagnetic signals are transmitted by an electromagnetic transmitter and collected by an electromagnetic collector.

3. The method of claim 1 wherein the 3D representation generator is a neural network.

4. The method of claim 1 wherein the 3D representation generator comprises a random sampling layer and a neural network, the random sampling layer having an input and generating an output based on a random sample of a distribution and a sharpness factor, the generated output being input to the neural network which outputs an initial 3D representation.

5. The method of claim 1 wherein the 4D motion generator generates the 4D motion field based on a polynomial equation with a motion weight for each coordinate of each voxel for each order of the polynomial equation.

6. The method of claim 1 wherein the 4D representation generator generates attenuation coefficients using differentiable image sampling.

7. The method of claim 1 wherein the adjusting of the scene weights and the motion weights applies a gradient descent to minimize an objective function.

8. A method performed by one or more computing systems for generating a four-dimensional (4D) representation of a scene based on a collected view of the scene, the collected view being collected while the scene is in motion, the method comprising:
    generating a 4D representation of the scene based on an initial three-dimensional (3D) representation and a 4D motion field, the initial 3D representation generated based on scene parameters, the 4D motion field generated based on motion parameters;
    generating a synthesized view of the scene from the generated 4D representation; and
    adjusting the scene parameters and the motion parameters based on differences between the collected view and the synthesized view.

9. The method of claim 8 further comprising
    generating the initial three-dimensional (3D) representation, a 3D representation having voxels that each represent a portion of the scene; and
    generating the 4D motion field that includes the motion field indicating motion of voxels of the initial 3D representation.

10. The method of claim 9 further comprising repeating the generating of the initial 3D representation, the 4D motion field, the 4D representation, and the synthesized view and the adjusting of the scene parameters and motion parameters until a termination criterion is satisfied.

11. The method of claim 8 wherein the scene includes a body part.

12. The method of claim 8 wherein the scene includes an object that is being manufactured.

13. The method of claim 8 wherein the scene relates to a geological event.

14. One or more computing systems for generating a four-dimensional (4D) representation of an object in motion based on a collected view of the object that is collected when the object is in motion, the one or more computing systems comprising:
    one or more non-transitory computer-readable storage mediums for storing computer-executable instructions for controlling the one or more computing systems to, until a termination condition is satisfied:
        generate an initial three-dimensional (3D) representation of the object based on object parameters, a 3D representation having voxels representing portions of the object;
        generate a 4D motion field based on motion parameters, the 4D motion field indicating location over time of voxels of the initial 3D representation; and
        generate a 4D representation of the object based on the initial 3D representation and the 4D motion fields, the 4D representation being a sequence of 3D representations that each represents a different time, the 4D representation comprising the 3D representations;
        generate a synthesized view of the object based on the 4D representation; and
        adjust the object parameters and the motion parameters based on differences between the collected view and the synthesized view;
    one or more processors for executing the computer-executable instructions stored in the one or more computer-readable storage mediums.

15. The one or more computing systems of claim 14 wherein a linear attenuation coefficient is associated with each voxel.

16. The one or more computing systems of claim 15 wherein the instructions that generate the 4D representation generate linear attenuation coefficients for voxels.

17. One or more non-transitory computer-readable storage mediums storing instructions comprising:
- a three-dimensional (3D) representation generator that generates an initial 3D representation of a scene based on scene parameters, a 3D representation having voxels with values;
- a four-dimensional (4D) motion generator that generates a 4D motion field based on motion parameters, the 4D motion field indicating motion of voxels of the scene;
- a 4D representation generator that generates a 4D representation of the scene based on the initial 3D representation and the 4D motion field, the 4D representation including a sequence of 3D representations having voxels with voxel values;
- a synthesized view generator that generates a synthesized view of the scene based on the 4D representation;
- a loss function that calculates a difference between a collected view of the scene and the synthesized view of the scene; and
- an optimizer that adjusts the scene parameters and the motion parameters based on the difference.

18. The one or more non-transitory computer-readable storage mediums of claim 17 wherein the instructions further comprise instructions that determine whether a termination criterion is satisfied based on the difference.

19. The one or more non-transitory computer-readable storage mediums of claim 17 wherein the collected view and synthesized view are sinograms.

20. The one or more non-transitory computer-readable storage mediums of claim 17 wherein the 3D representation generator includes a multi-level perceptron.

\* \* \* \* \*